(12) United States Patent
Hayano et al.

(10) Patent No.: US 7,937,607 B2
(45) Date of Patent: May 3, 2011

(54) ASYNCHRONOUS DATA HOLDING CIRCUIT (75) Inventors: Masahiko Hayano, Tokyo (JP);
Yoshitaka Suzuki, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 896 days.

(21) Appl. No.: 11/889,860

(22) Filed: Aug. 17, 2007

(65) Prior Publication Data
US 2008/0072094 A1    Mar. 20, 2008

(30) Foreign Application Priority Data
Sep. 14, 2006    (JP) ................................. 2006-249601

(51) Int. Cl.
*H04L 7/00* (2006.01)
*G06F 13/42* (2006.01)

(52) U.S. Cl. ........................................ 713/600; 713/400

(58) Field of Classification Search ................... 713/400, 713/600
See application file for complete search history.

(56) References Cited

U.S. PATENT DOCUMENTS

| 2001/0042219 A1* | 11/2001 | Robertson ................... 713/400 |
| 2002/0199124 A1* | 12/2002 | Adkisson .................... 713/400 |
| 2009/0271651 A1* | 10/2009 | Pothireddy et al. ........... 713/400 |

FOREIGN PATENT DOCUMENTS
JP    11-103238    4/1999

* cited by examiner

*Primary Examiner* — Mark Connolly
(74) *Attorney, Agent, or Firm* — Studebaker & Brackett PC; Donald R. Studebaker (57) ABSTRACT

An asynchronous data holding circuit including a source synchronizer which acquires an enable signal synchronized with a destination clock, in response to a rising or falling edge of the enable signal, acquires the other one of the rising or falling edge of the enable signal in synchronization with a source clock, and outputs the enable signal, a first data holding unit which holds a data signal from the source, in response to the enable signal from the source synchronizer and the source clock, a destination synchronizer which outputs the enable signal from the source synchronizer, in synchronization with the destination clock, and a second data holding unit which holds the data signal in the first data holding unit in response to the enable signal from the destination synchronizer and the destination clock, is provided.

8 Claims, 10 Drawing Sheets

ASYNCHRONOUS DATA HOLDING CIRCUIT

CROSS-REFERENCE TO RELATED APPLICATION

This application claims priority under 35 USC 119 from Japanese Patent Application No. 2006-249601, the disclosure of which is incorporated by reference herein.

BACKGROUND OF THE INVENTION

1. Field of the Invention

The present invention relates to an asynchronous data holding circuit, and particularly, to an asynchronous data holding circuit which holds a data signal synchronized with a clock of the source, in synchronization with a clock of the destination.

2. Description of the Related Art

Conventionally, clock signals are used for transferring data between registers. For example, a circuit which transfers data from a register to another register by using the same clock signal is well known (for example, refer to Japanese Patent Application Laid-Open (JP-A) No. 11-103238).

Figure 8:
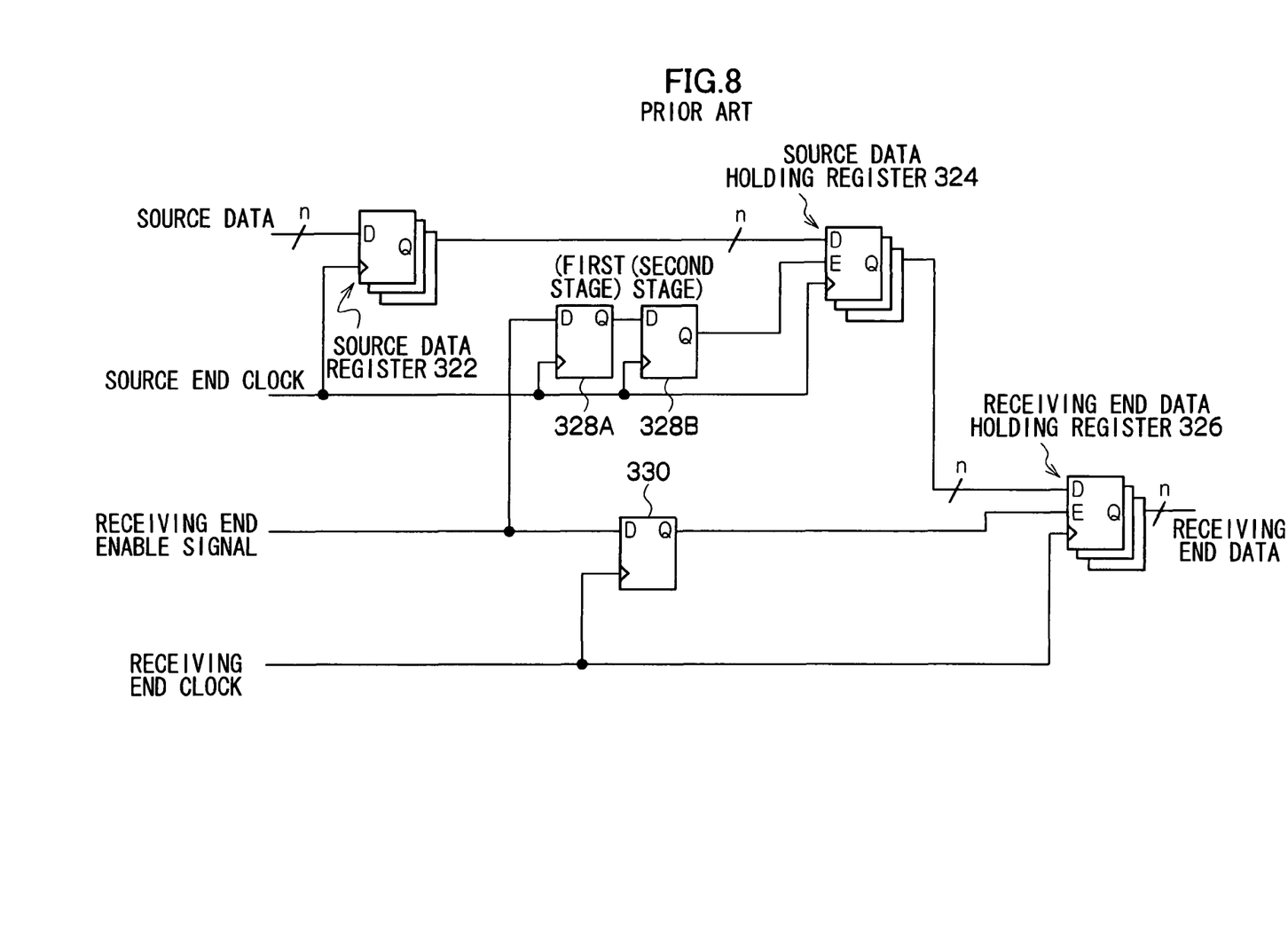
FIG. 8 is a circuit diagram showing a structure of an asynchronous data handoff circuit of the conventional technique.

Even in a circuit in which a frequency of a clock signal is different between a transfer source register and a transfer destination register, data is transferred. In this case, an asynchronous data handoff circuit configured as shown in FIG. 8 is generally used.

A source data register 322 acquires source data of n bits at a rising edge of a source end clock and outputs the n-bit data in synchronization with the source end (i.e., communication) clock. A D flip flop 328A receives a destination (i.e., receiving) end enable signal at the rising edge of the source end clock, the signal is synchronized with the source end clock using two stages synchronization of the D flip flop 328A and a D flip flop 328B, and the synchronized enable signal is output to a source data holding register 324 as a write enable signal. The n-bit data supplied from the source data register 322 is stored in the source data holding register 324 when the enable signal output from the D flip flop 328B is 1. The use of the terminologies "source end clock" and "receiving end clock" in describing the aforementioned conventional circuit herein can be seen as being respectively analogous to "communication clock" and "system clock" used in describing the present invention. Moreover, the terminology "destination" is interchangeably used with "receiving", such as in "destination end" and "receiving end." Hence, "destination end" or "receiving end" should be understood as specifying "system end" or a system-side of a circuit.

At the rising edge of the destination end enable signal and the destination end clock, a D flip flop 330 acquires the destination end enable signal and outputs the write enable signal to a destination end data storage register 326, and the output of the source data storage register 324 is stored in the destination end data storage register 326.

Figure 9:
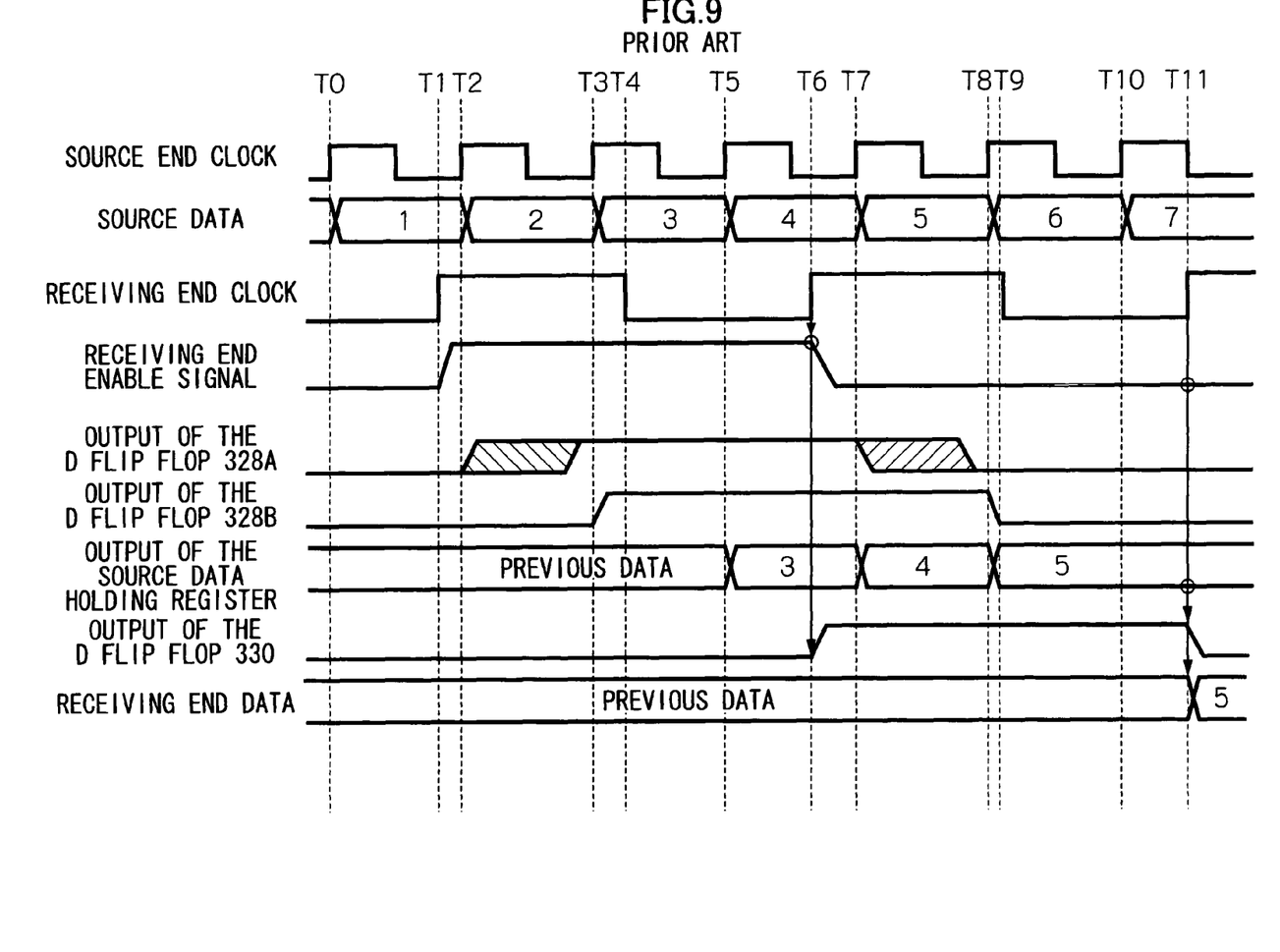
FIG. 9 is a time chart showing an operation of the asynchronous data handoff circuit of the conventional technique when the frequency of a communication clock (i.e., source end clock) signal is lower than that of a system clock signal (i.e., receiving end clock signal")

In the above circuit structure, when the frequency of the source end clock is higher than that of the destination end clock, as shown in FIG. 9, the destination end enable signal turned active (=1) at timing T1 is output to the source data storage register 324 at timing T3 in synchronization with the source end clock, and the n bit source data is stored in the source data storage register 324 at timing T5, T7, and T8. The output of the source data storage register 324 is acquired into the destination end data storage register 326 at timing T11 in response to the enable signal output from the D flip flop 330 and the destination end clock. In this way, data can be transferred without missing.

Figure 10:
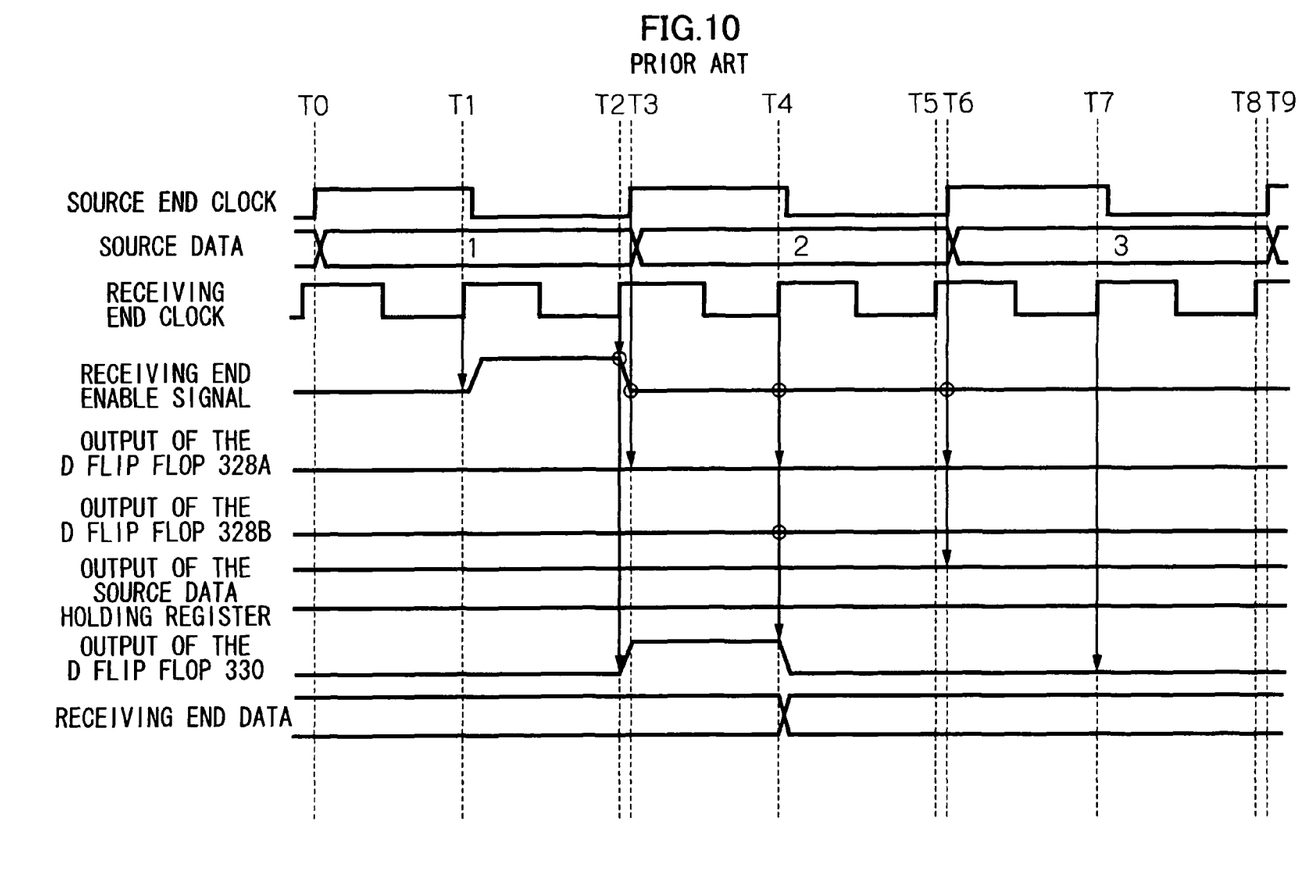
FIG. 10 is a time chart showing an operation of the asynchronous data handoff circuit of the conventional technique when the frequency of the communication clock signal (i.e., source end clock signal) is higher than that of the system clock signal (i.e., receiving end clock signal").

On the other hand, when the frequency of the source end clock is lower than that of the destination end clock, as shown in FIG. 10, the destination end enable signal turned active (=1) at timing T1 falls down at timing T2. Therefore, the destination end enable signal is not active when the source end clock rises up at timing T3, and as a result of this the data will not stored in the source data storage register 324.

As described above, in the conventional asynchronous data handoff circuit, when the frequency of the source end clock is lower than that of the destination end clock, data may not be transferred in some phase difference and there is the possibility of missing some pieces of data.

SUMMARY OF THE INVENTION

Considering the above, the present invention provides an asynchronous data holding circuit which may certainly acquire (take in) and maintain data from a source end without lack of data even when a respective clock is different between the source and the destination.

A first aspect of the present invention provides an asynchronous data holding circuit including: a source (output end) synchronizer which acquires an enable signal, which is synchronized with a destination (input end) clock signal, in response to one of a rising edge and a falling edge of the enable signal, acquires the other one of the rising edge and the falling edge of the enable signal in synchronization with a source clock signal, and outputs the acquired enable signal in synchronization with the source clock signal, a first data holding unit which acquires and holds a data signal output from a source, in response to the enable signal output from the source synchronizer and the source clock signal, a destination synchronizer which outputs the enable signal output from the source synchronizer, in synchronization with the destination clock signal, and a second data holding unit which acquires and holds the data signal held in the first data holding unit in response to the enable signal output from the destination synchronizer, and the destination clock signal.

In the asynchronous data holding circuit of the first aspect, the source synchronizer (synchronization unit) acquires the enable signal in response to one of the rising edge and the falling edge of the enable signal synchronized with the destination clock, acquires the other of the rising edge and the falling edge of the enable signal in synchronization with the source clock, and outputs the acquired enable signal in synchronization with the source clock. In response to the enable signal output from the source synchronizer and the source clock, the first data holding unit acquires and holds the data signal output from the source.

The destination synchronizer outputs the enable signal which is output from the source synchronizer, in synchronization with the destination clock, and the second data holding unit acquires and holds the data signal held in the first data holding unit in response to the enable signal output from the destination synchronizer and the destination clock.

In this way, since the source synchronizer acquires the enable signal in response to one of the rising edge and the falling edge of the enable signal, it is possible to surely acquire the one of the rising edge and the falling edge of the enable signal even when the source clock and the destination clock are different from each other. Since the enable signal output from the source synchronizer is synchronized again with the destination clock, and in response to this enable signal, the data signal is acquired and held in the first holding unit, it is possible to acquire the stably held data signal from the first holding unit. Therefore, even when the source clock and the destination clock are different from each other, it is possible to surely acquire and hold the data signal from the source without missing.

In the asynchronous data holding circuit of the first aspect, the destination synchronizer may include: a first D flip flop in which the enable signal output from the source synchronizer is input to a data terminal and the destination clock signal is input to a clock terminal, and a second D flip flop in which an output terminal of the first D flip flop is connected to a data terminal, the destination clock signal is input to a clock terminal, and the enable signal, which is synchronized with the destination clock signal, is output from an output terminal. Owing to the two-stage synchronization by the first D flip flop and the second D flip flop, the enable signal may be output in synchronization with the destination clock.

A second aspect of the present invention provides an asynchronous data holding circuit including: a source synchronizer which acquires an enable signal, which is synchronized with a destination clock signal, in response to one of a rising edge and a falling edge of the enable signal, acquires the other one of the rising edge and the falling edge of the enable signal in synchronization with a source clock signal, and outputs the acquired enable signal in synchronization with the source clock signal, a first data holding unit which acquires and holds a data signal output from a source, in response to the enable signal output from the source synchronizer and the source clock signal, a delay unit which outputs the enable signal synchronized with the destination clock signal with delay for a predetermined number of clocks of the destination clock signal, and a second data holding unit which acquires and holds the data signal held in the first data holding unit in response to the enable signal output from the delay unit, and the destination clock signal.

In an asynchronous data holding circuit according to a second invention, the source synchronizer acquires the enable signal which is synchronized with the destination clock, in response to one of the rising edge and the falling edge of the enable signal, acquires the other one of the rising edge and the falling edge of the enable signal in synchronization with the source clock, and outputs the acquired enable signal in synchronization with the source clock. In response to the enable signal output from the source synchronizer and the source clock, the first data holding unit acquires and holds the data signal output from the source.

The delay unit outputs the enable signal synchronized with the destination clock with delay for a predetermined number of clocks of the destination clock. In response to the enable signal output from the delay unit and the destination clock, the second data holding unit acquires and holds the data signal held in the first data holding unit.

In this way, since the source synchronizer acquires the enable signal in response to one of the rising edge and the falling edge of the enable signal, it is possible to acquire the one of the rising edge or the falling edge of the enable signal surely, even when the source clock and the destination clock are different from each other. Since the data signal is acquired and held in the first holding unit in response to the enable signal delayed for the predetermined number of clocks, it is possible to acquire the stably held data signal from the first holding unit. Therefore, even when the source clock and the destination clock are different from each other, it is possible to surely acquire and hold the data signal from the source without missing.

In the asynchronous data holding circuit of the second aspect, the delay unit may be formed by connecting a plurality of D flip flops corresponding to the predetermined number of clocks. Since synchronization is established repeatedly in the D flip flops corresponding to the predetermined number of clocks, it is possible to output the enable signal with delay.

In the asynchronous data holding circuit of the above aspects, the source synchronizer may include: a third D flip flop in which the enable signal is input to a data terminal and a set terminal, and the source clock signal is input to a clock terminal, and a fourth D flip flop in which a data terminal is connected to the output terminal of the third D flip flop, the source clock signal is input to a clock terminal, and the enable signal which is synchronized with the source clock signal is output from an output terminal. Therefore, it is possible to surely acquire the enable signal through the set terminal of the third D flip flop in response to one of the rising edge and the falling edge of the enable signal, and to output the acquired enable signal through the fourth D flip flop in synchronization with the source clock.

In the asynchronous data holding circuit of the above aspects, the first data holding unit and the second data holding unit may hold data signals of plural bits. In this structure, the second holding unit may acquire the stably held data signal from the first holding unit. Therefore, even when the update timing of the data signal is deviated in bits, it is possible to accurately acquire the data signals of plural bits.

As described above, according to the asynchronous data holding circuit of the present invention, since the source synchronizer acquires the enable signal in response to one of the rising edge and the falling edge of the enable signal, it is possible to surely acquire the one of the rising edge and the falling edge of the enable signal even when the destination clock and the source clock are different from each other. Further, the stably held data signal can be acquired from the first holding unit. Therefore, even when the source clock and the destination clock are different from each other, it is possible to surely acquire and hold the data signal from the source without missing.

BRIEF DESCRIPTION OF THE DRAWINGS

Exemplary embodiments of the present invention will be described in detail based on the following figures, wherein.

DETAILED DESCRIPTION OF THE INVENTION

Hereinafter, exemplary embodiments of the present invention will be described in detail referring to the drawings. In the embodiments, examples in the case where the invention is applied to an asynchronous data handoff circuit set in a semiconductor integrated circuit will be described.

Figure 1:
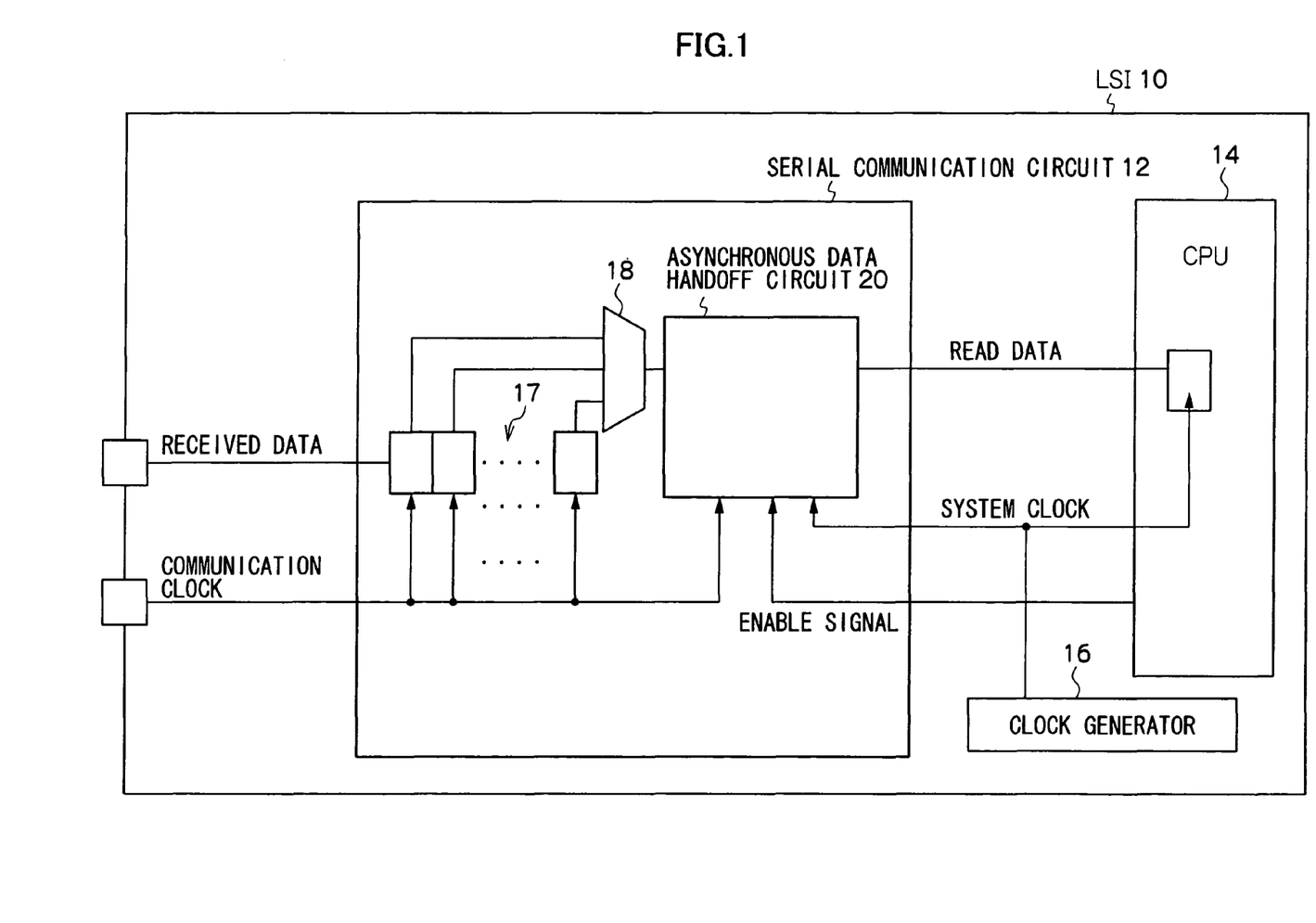
FIG. 1 is a block diagram showing the structure of a semiconductor integrated circuit according to a first exemplary embodiment of the invention.

As shown in FIG. 1, a semiconductor integrated circuit 10 according to a first exemplary embodiment includes a serial communication circuit 12, a CPU 14, and a clock generator 16. The serial communication circuit 12 performs serial communication with the outside and receives data and a communication clock signal from the outside. The clock generator 16 generates a system clock signal that defines an operation timing of the CPU 14. The frequency of the communication clock signal is different from the frequency of the system clock signal.

The CPU 14 outputs an enable signal for specifying read data in the data received by the serial communication circuit 12 to the serial communication circuit 12 and reads out from the serial communication circuit 12 the received data corresponding to the enable signal. When the data is read by the CPU 14, the received data synchronized with the communication clock signal is synchronized with the system clock signal by the serial communication circuit 12 and is read by the CPU 14. The enable signal output from the CPU 14 is synchronized with the system clock.

The serial communication circuit 12 includes plural buffers 17 which acquire the received data using the FIFO method, a selector 18 which selects one of the buffers 17, and an asynchronous data handoff circuit 20. The asynchronous data handoff circuit 20 operates as an asynchronous data holding circuit to hand off the received data of the buffer selected by the selector 18 to the CPU 14 in synchronization with the system clock signal. The communication clock signal from the outside, the system clock signal from the clock generator 16, and the enable signal from the CPU 14 are input to the asynchronous data handoff circuit 20.

Figure 2:
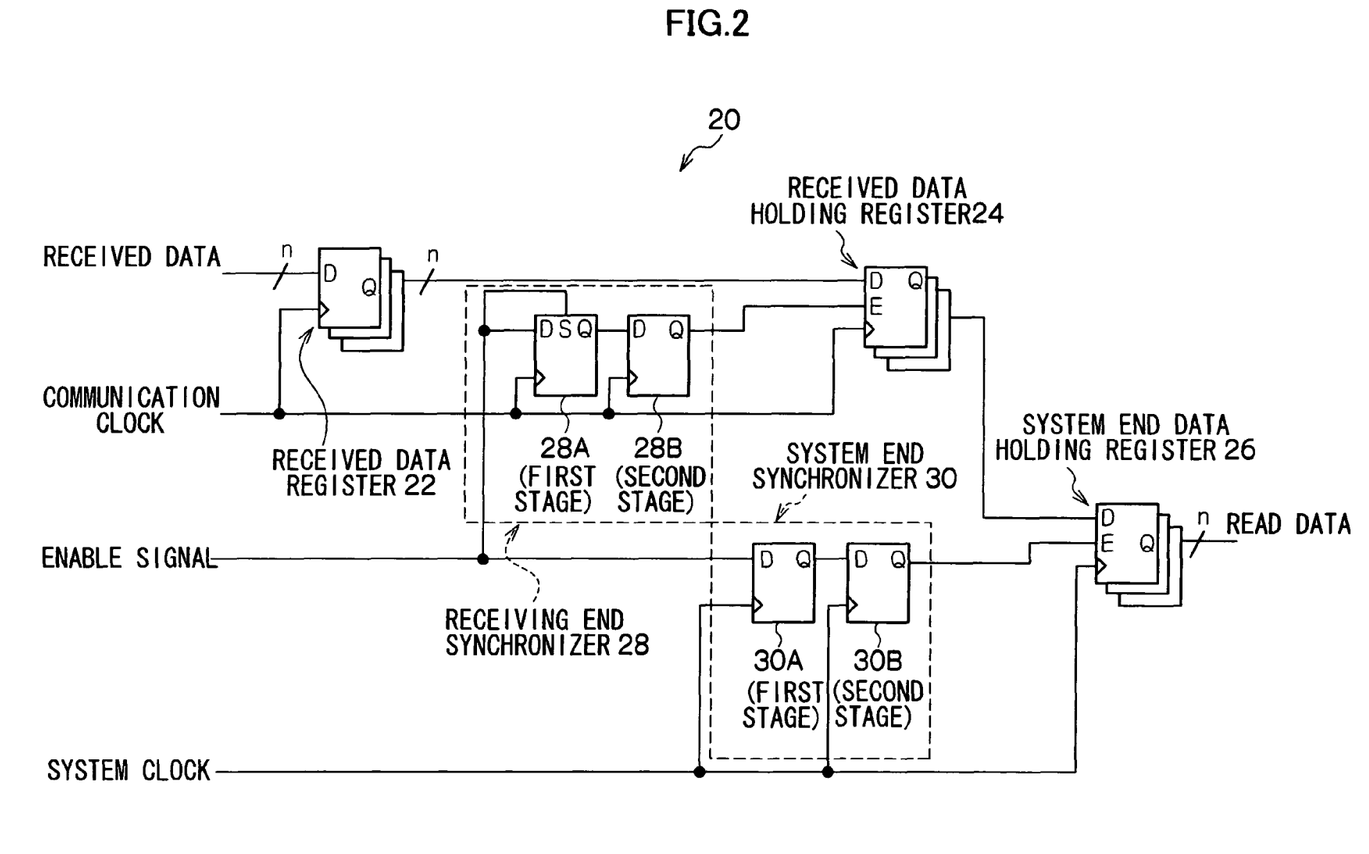
FIG. 2 is a circuit diagram showing a structure of an asynchronous data handoff circuit according to the first exemplary embodiment of the invention.

Next, the circuitry of the asynchronous data handoff circuit 20 will be described referring to FIG. 2. The asynchronous data handoff circuit 20 includes a received data register 22 for n bit which stores the received data of n bit width (n>2), a received data holding register 24 for n bit which receives the n-bit received data stored in the received data register 22, and a system (destination) end data holding register 26 for n bit which acquires and holds the received data stored in the received data holding register 24.

The asynchronous data handoff circuit 20 further includes a receiving (source) end synchronizer 28 which synchronizes an input signal with the communication clock signal and a system (destination) end synchronizer 30 which synchronizes the input signal with the system clock signal. The receiving end synchronizer 28 includes a D flip flop 28A of a first stage with an S terminal and a D flip flop 28B of a second stage, for two-stage synchronization. The system end synchronizer 30 includes a D flip flop 30A of a first stage and a D flip flop 30B of a second stage, for two-stage synchronization.

A data signal of the received data is input to a data input D terminal of the received data register 22 and a Q terminal that is an output terminal of the received data register 22 is connected to a D terminal of the received data holding register 24. A Q terminal that is the output terminal of the received data holding register 24 is connected to a D terminal of the system end data holding register 26 and read data is output from a Q terminal of the system end data holding register 26.

An enable signal is input to a D terminal and the S terminal of the D flip flop 28A in the receiving end synchronizer 28 and a Q terminal that is the output terminal of the D flip flop 28A is connected to a D terminal of the D flip flop 28B. A Q terminal of the D flip flop 28B is connected to an E terminal of the received data holding register 24 and the Q terminal of the D flip flop 28B is connected to a D terminal of the D flip flop 30A in the system end synchronizer 30.

A Q terminal that is the output terminal of the D flip flop 30A is connected to a D terminal of the D flip flop 30B and a Q terminal of the D flip flop 30B is connected to the E terminal of the system end data holding register 26.

The communication clock signal is input to the received data register 22, the D flip flops 28A and 28B of the receiving end synchronizer 28, and each clock terminal of the received data holding register 24. The system clock signal is input to each clock terminal of the D flip flops 30A and 30B of the system end synchronizer 30 and the system end data holding register 26.

The received data register 22 acquires and stores the received data in synchronization with the communication clock signal. The received data holding register 24 acquires and holds the received data stored in the received data register 22 in response to the enable signal and the communication clock signal output from the receiving end synchronizer 28. The system end data holding register 26 acquires and holds the received data held in the received data holding register 24 in response to the enable signal and the system clock signal output from the system end synchronizer 30.

When the enable signal input in the S terminal rises up, the D flip flop 28A of the receiving end synchronizer 28 acquires the enable signal via the D terminal without synchronization with the communication clock signal, and sets it at 1. When the enable signal falls down, the D flip flop 28A acquires the enable signal via the D terminal in synchronization with the communication clock signal and sets the signal at 0.

The D flip flop 28B of the receiving end synchronizer 28 and the D flip flops 30A and 30B of the system end synchronizer 30 perform the same operation as that of a general D flip flop.

Next, an operation of the semiconductor integrated circuit 10 according to the first exemplary embodiment will be described.

When the semiconductor integrated circuit 10 receives data from the outside, the received data as well as the communication clock signal are input to the serial communication circuit 12, where the received data is temporarily stored in the buffer 17 and input to the asynchronous data handoff circuit 20 through the selector 18. At this time, the system clock signal is input to the asynchronous data handoff circuit 20 in the serial communication circuit 12 from the clock generator 16.

When the CPU 14 reads out the received data from the asynchronous data handoff circuit 20 in the serial communication circuit 12, the CPU 14 inputs the enable signal to the asynchronous data handoff circuit 20 and reads out the received data corresponding to the input timing of the enable signal from the asynchronous data handoff circuit 20.

At this time, the asynchronous data handoff circuit 20 operates as below. Firstly, an example in a case where the frequency of the communication clock signal is lower than that of the system clock signal will be described.

Figure 3:
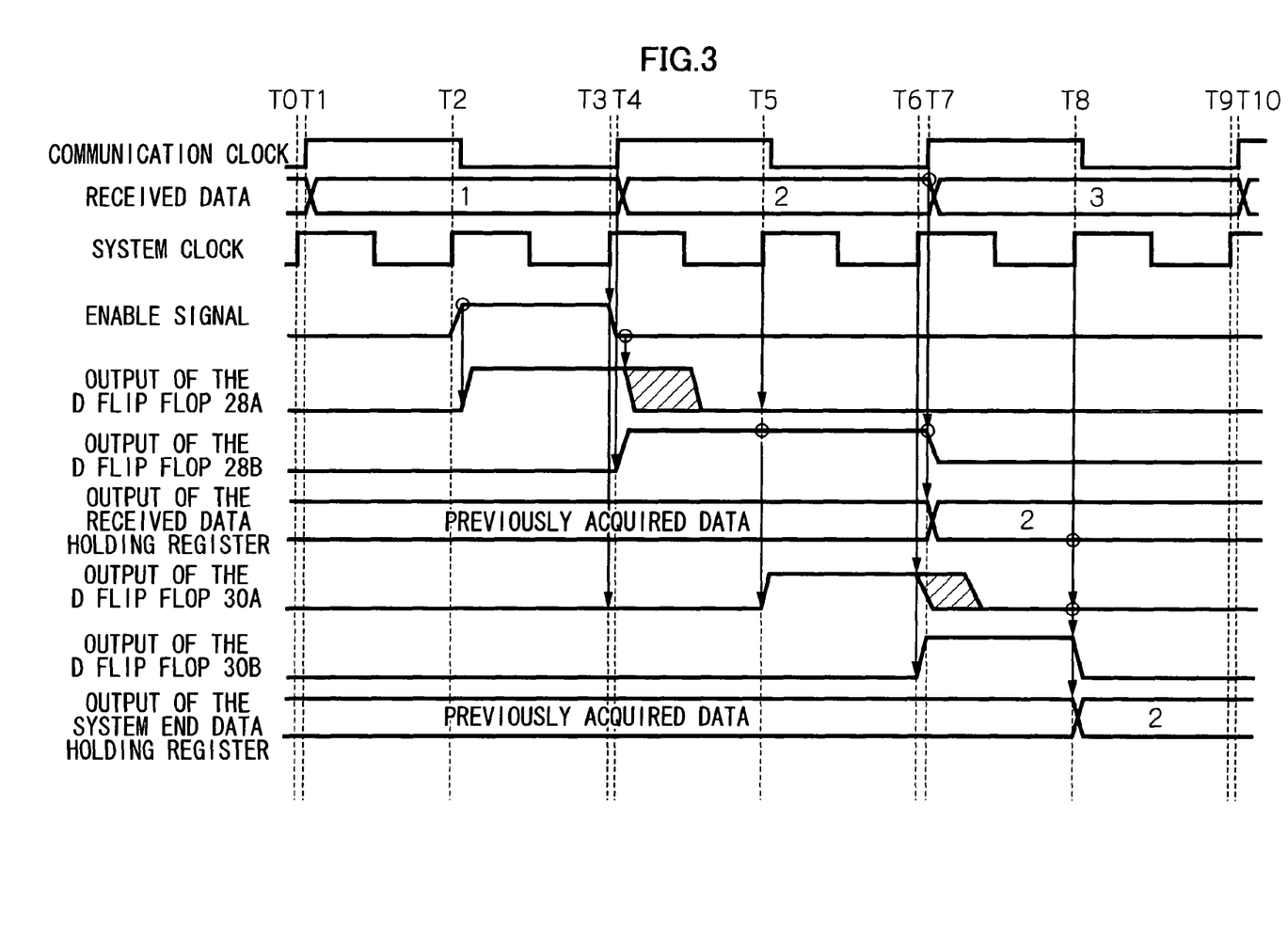
FIG. 3 is a time chart showing an operation of the asynchronous data handoff circuit according to the first exemplary embodiment when the frequency of a communication clock signal is lower than that of a system clock signal.

As shown in FIG. 3, when the enable signal rises up (becomes active) at timing T2, the D flip flop 28A acquires the risen-up enable signal asynchronously with the communication clock and sets the signal at 1. Further, it acquires the falling enable signal at timing T4 in synchronization with the communication clock. Although the enable signal falls down (negated) at timing T3, the risen-up enable signal has been already acquired by the D flip flop 28A and set at 1. Therefore, the risen-up enable signal can be acquired by the D flip flop 28B in synchronization with the communication clock.

At timing T7, in response to the enable signal output from the D flip flop 28B and the communication clock signal, the data signal of the received data is transferred from the received data register 22 to the received data holding register 24 and held in the received data holding register 24. The enable signal output from the receiving end synchronizer 28 passes through the D flip flops 30A and 30B, and at timing T7, the enable signal output from the system end synchronizer 30 is active (=1). At timing T8, the system end data holding register 26 acquires and holds the data signal of the received data from the received data holding register 24 in response to the enable signal output from the system end synchronizer 30 and the system clock, and transfers the acquired data signal to the CPU 14 as read data.

Figure 4:
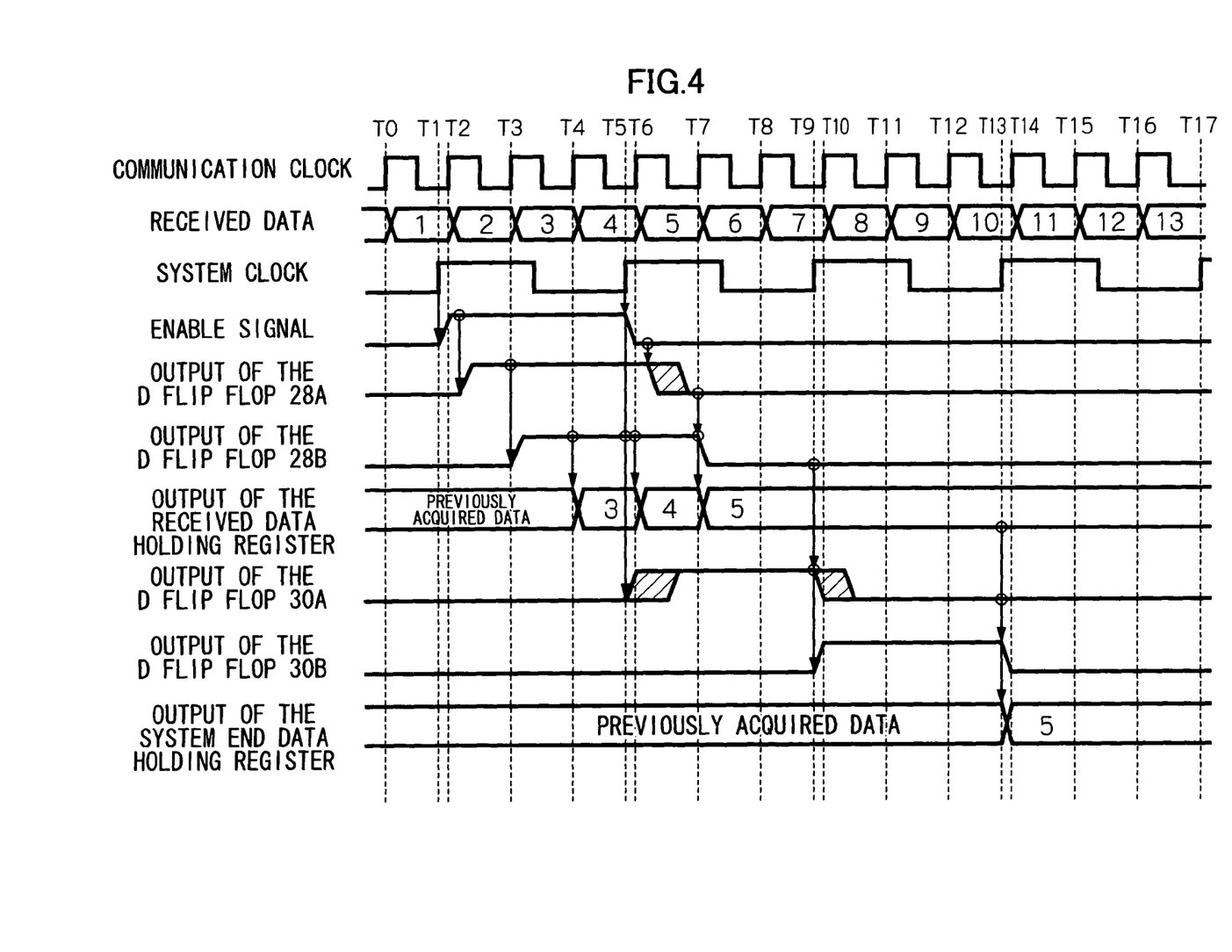
FIG. 4 is a time chart showing an operation of the asynchronous data handoff circuit according to the first exemplary embodiment when the frequency of the communication clock signal is higher than that of the system clock signal.

Next, a case where the frequency of the communication clock signal is higher than that of the system clock signal will be described referring to FIG. 4.

Simultaneously with timing T1 when the enable signal rises up, the D flip flop 28A of the receiving end synchronizer 28 acquires the risen-up enable signal asynchronously with the communication clock and sets the signal at 1, and at timing T6, the D flip flop 28A acquires the falling enable signal in synchronization with the communication clock. At this time, the output of the D flip flop 28A is acquired by the D flip flop 28B sequentially at timing T3, T4, and T6, and due to the enable signal output from the D flip flop 28B changing to active (=1), the received data holding register 24 sequentially acquires and holds the data signal of the received data from the received data register 22.

Further, the enable signal output from the D flip flop 28B of the receiving end synchronizer 28 becomes active (=1) at timing T9 after passing through the D flip flops 30A and 30B of the system end synchronizer 30. At timing T13, the system end data holding register 26 acquires and holds the data signal of the received data from the received data holding register 24 in response to the enable signal output from the system end synchronizer 30 and the system clock, and transfers the signal to the CPU 14 as read data.

Accordingly, the rising edge of the enable signal from the CPU 14 is surely acquired by the receiving end synchronizer 28 and the received data is acquired and held by the received data holding register 24. The enable signal which is synchronized with the communication clock signal by the receiving end synchronizer 28 is synchronized with the system clock again by the system end synchronizer 30 and acquired by the system end data holding register 26 with delay. Therefore, the received data can be acquired by the system end data holding register 26 from the received data holding register 24 in a state that the received data is stably held in the received data holding register 24.

Thus the received data stably acquired by the system end data holding register 26 is read by the CPU 14.

As described above, according to the asynchronous data handoff circuit of the semiconductor integrated circuit of the first exemplary embodiment, the D flip flop of the first stage in the receiving end synchronizer acquires the enable signal in response to the rising edge of the enable signal. Thereby, even when the communication clock and the system clock are different from each other, it is possible to surely acquire the rising edge of the enable signal. Further, the enable signal which is output from the receiving end synchronizer is synchronized with the system clock again, and the data signal of the received data is acquired and held by the system end data holding register from the received data holding register in response to the enable signal. Thereby, the data signal of the received data which is stably held can be acquired from the received data holding register. Accordingly, even when the communication clock and the system clock are different from each other, it is possible to surely acquire and hold the data signal of the received data without missing.

The risen-up enable signal can be surely acquired through the S terminal of the D flip flop of the first stage in the receiving end synchronizer in response to the rising edge of the enable signal and the acquired enable signal can be output in synchronization with the communication clock through the D flip flop of the second stage.

Further, system end synchronizer can output the enable signal output from the receiving end synchronizer in synchronization with the system clock, by performing two-stage synchronization by two D flip flops, i.e., the first and the second D flip flops.

Even when each register is a register for plural bits and holds the data for the plural bits, the data signal of the received data stably held in the received data holding register can be acquired from the received data holding register. Therefore, even when the update timing of the data signal is deviated between the bits, the data signals for the plural bits can be accurately output to the system end data holding register.

Even when the communication clock of the received data is at a lower speed than the system clock, the CPU can accurately acquire the received data in synchronization with the system clock.

Although in the above exemplary embodiment the example where the CPU receives the received data using the asynchronous data handoff circuit, the present invention is not limited to this. For example, the present invention may be applied to a structure in which, a counter value is read as data synchronized with the system clock via the asynchronous data handoff circuit of the exemplary embodiment when a CPU reads the counter value from a counter which operates asynchronously to the system clock.

Next, a second exemplary embodiment will be described. The same reference numerals are assigned to the same components as those of the first exemplary embodiment and their description is omitted.

The second exemplary embodiment is different from the first exemplary embodiment in that the enable signal input to the system end data holding register is a signal obtained by delaying the enable signal output from the CPU for a predetermined clock.

Figure 5:
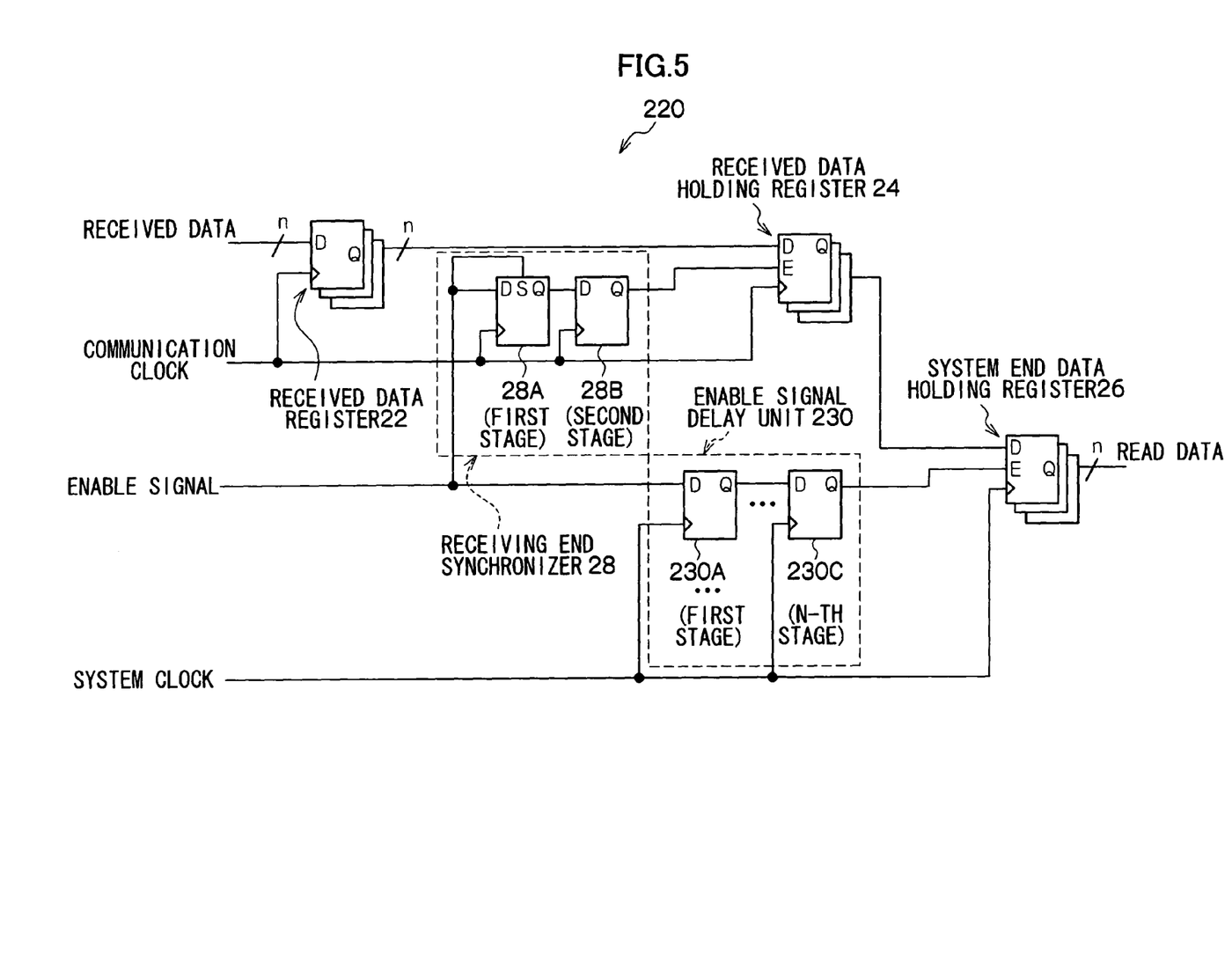
FIG. 5 is a circuit diagram showing a structure of an asynchronous data handoff circuit according to a second exemplary embodiment of the invention.

As shown in FIG. 5, an asynchronous data handoff circuit 220 according to the second exemplary embodiment includes the received data register 22, the received data holding register 24, the system end data holding register 26, the receiving end synchronizer 28, and an enable signal delay unit 230. The enable signal delay unit 230 delays the enable signal from the CPU 14 for the predetermined clock and outputs the delayed signal.

The enable signal delay unit 230 includes N stages (where N is an integer of 2 or more, for example, three (3) stages) of D flip flops 230A to 230C. The input enable signal is synchronized with the system clock signal due to the N stages, and the enable signal is output with delay by N clocks from the system clock signal.

Based on a range of frequency of the input communication clock signal, the number of stages N may be set to be the same as the number of system clocks necessary for stably holding the data signal in the received data holding register 24.

The enable signal is input to the D terminal of the D flip flop 230A and the Q terminal is connected to the D terminal of the D flip flop (not illustrated) of the second stage. The Q terminal of the D flip flop of the second stage is connected to the D terminal of the D flip flop 230C of the third stage and the Q terminal is connected to the E terminal of the system end data holding register 26.

Since the components other than the asynchronous data handoff circuit 220 in the semiconductor integrated circuit are the same as those of the first exemplary embodiment, their description is omitted.

Next, an operation of the asynchronous data handoff circuit 220 according to the second exemplary embodiment will be described. At first, a case where the frequency of the communication clock signal is lower than that of the system clock signal will be described referring to FIG. 6.

Figure 6:
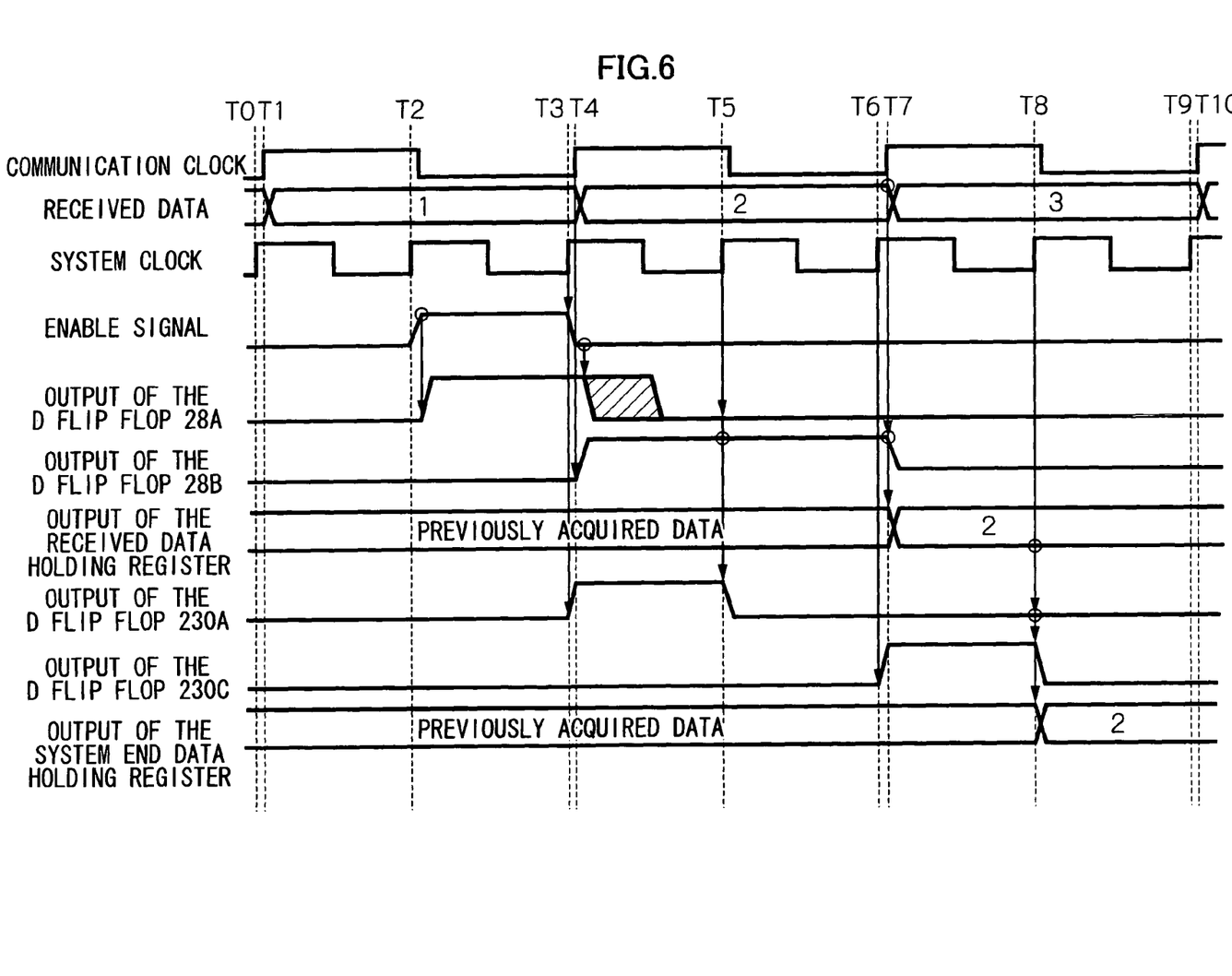
FIG. 6 is a time chart showing an operation of the asynchronous data handoff circuit according to the second exemplary embodiment when the frequency of a communication clock signal is lower than that of a system clock signal.

When the enable signal rises up (becomes active) at timing T2, the D flip flop 28A acquires the enable signal asynchronously with the communication clock and sets the signal at 1, and at timing T4, the D flip flop 28A acquires the falling enable signal in synchronization with the communication clock. Although the enable signal falls down (negated) at timing T3, the D flip flop 28A has already acquired the risen up enable signal and set the signal at 1. Therefore, at timing T4, the risen up enable signal can be acquired by the D flip flop 28B. At timing T7, in response to the enable signal output from the D flip flop 28B and the communication clock, the data signal of the received data is acquired from the received data register 22 to the received data holding register 24 and held there.

Since the enable signal from the CPU 14 passes through the D flip flops 230A to 230C in the enable signal delay unit 230, the enable signal that is output from the enable signal delay unit 230 becomes active (=1) at timing T6, after it has been delayed for three clocks of the system clock signal from timing T2 at which the enable signal rises. At timing T8, the system end data holding register 26 acquires and holds the received data from the received data holding register 24 in response to the system clock and the enable signal from the D flip flop 230C of the N-th stage in the enable signal delay unit 230, and the received data is transferred to the CPU 14 as read data.

Figure 7:
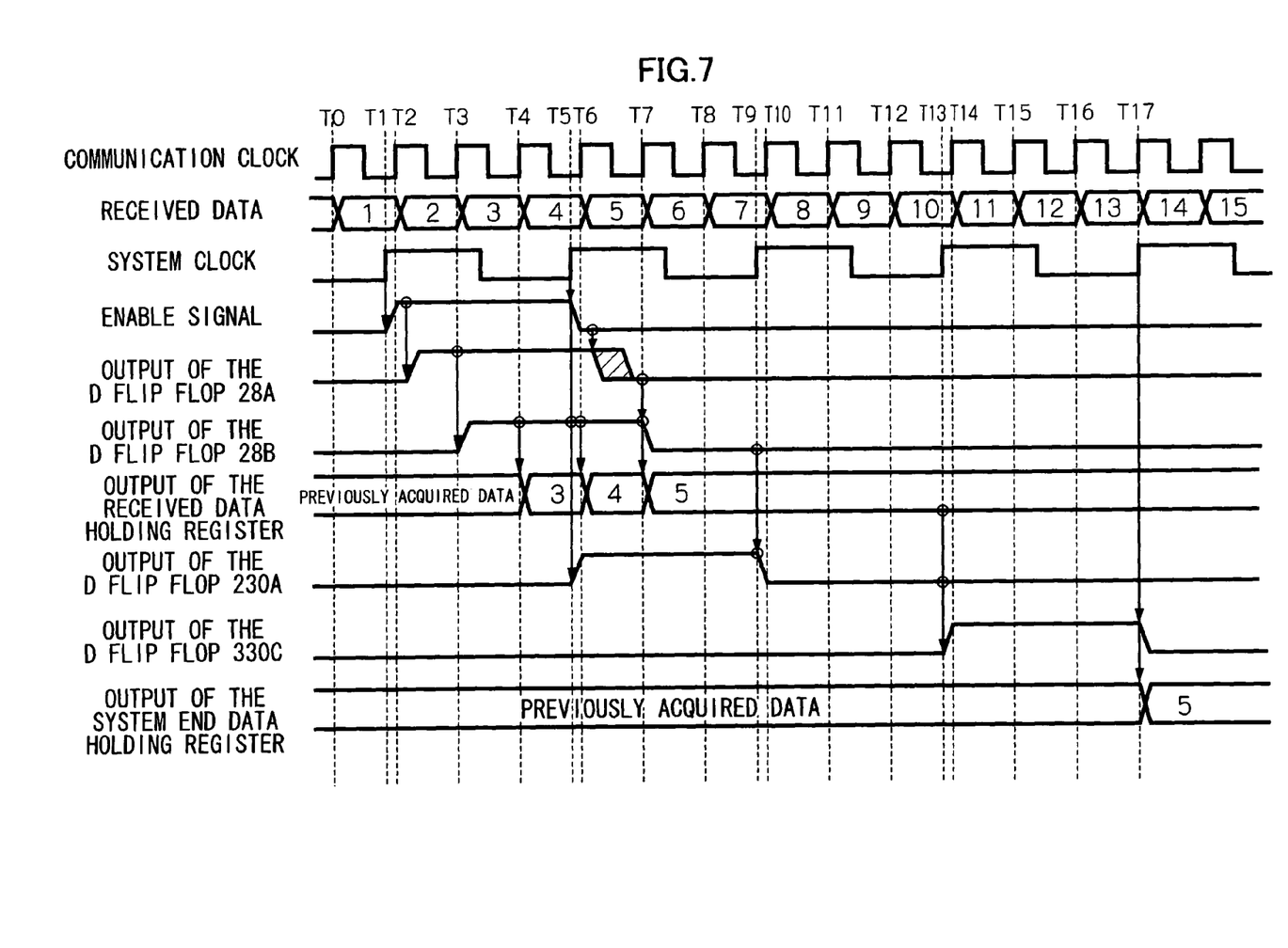
FIG. 7 is a time chart showing an operation of the asynchronous data handoff circuit according to the second exemplary embodiment when the frequency of the communication clock signal is higher than that of the system clock signal.

Next, a case where the frequency of the communication clock signal is higher than that of the system clock signal will be described referred to FIG. 7.

Simultaneously with timing T1, when the enable signal rises up, the D flip flop 28A of the receiving end synchronizer 28 acquires the enable signal asynchronously with the communication clock and sets the signal at 1, and at timing T6, the D flip flop 28A acquires the falling enable signal in synchronization with the communication clock. At this time, the output of the D flip flop 28A is acquired by the D flip flop 28B sequentially at timing T3, T4, and T6 and the output of the D flip flop 28B becomes active (=1). The received data holding register 24 sequentially acquires and holds the data signal of the received data from the received data register 22 in response to the enable signal output from the receiving end synchronizer 28 and the communication clock.

The enable signal from the CPU 14 passes through the D flip flops 230A to 230C in the enable signal delay unit 230 and the enable signal that is output from the enable signal delay unit 230 becomes active (=1) at timing T13 after it has been delayed for three clocks of the system clock signal from the timing T3 when the enable signal rises. At timing T17, the system end data holding register 26 acquires and holds the data signal of the received data from the received data holding register 24 in response to the system clock and the enable signal output from the D flip flop 230C of the N-th stage in the enable signal delay unit 230, and the acquired signal is transferred to the CPU 14 as read data.

As described above, the rising edge of the enable signal from the CPU 14 is surely acquired by the receiving end synchronizer 28 and the data signal of the received data is held in the received data holding register 24. The enable signal supplied from the CPU 14 is delayed for the predetermined clocks and input to the system end data holding register 26 by the enable signal delay unit 230. Therefore, the system end data holding register 26 can acquire the data signal of the received data by which is stably held in the received data holding register 24.

Thereby, the received data stably acquired by the system end data holding register 26 can be read by the CPU 14.

As described above, according to the semiconductor integrated circuit of the second exemplary embodiment, the D flip flop of the first stage in the receiving end synchronizer acquires the enable signal in response to the rising edge of the enable signal. Owing to this, even when the communication clock and the system clock are different from each other, it is possible to surely acquire the rising edge of the enable signal. Further, the enable signal is delayed for the predetermined number of clocks, and the data signal is acquired and held by the system end data holding register from the received data holding register in response to the delayed enable signal. Owing to this, the system end data holding register can acquire from the received data holding register the data signal of the received data which is stably held in the received data holding register. Accordingly, even when the communication clock and the system clock are different from each other, the data signal of the received data can be surely acquired and held without missing.

Since the synchronization is established in the N stages between the D flip flops for the predetermined number N of clocks, the enable signal can be output to the system end data holding register with delay.

What is claimed is:

1. An asynchronous data holding circuit comprising:
a source synchronizer configured to receive an enable signal, which is synchronized with a system clock signal, in response to one of a rising edge and a falling edge of the enable signal, to acquire the other one of the rising edge and the falling edge of the enable signal in synchronization with a communication clock signal, and to output the received enable signal in synchronization with the communication clock signal,
a first data holding unit configured to acquire and hold a data signal received, in response to the enable signal output from the source synchronizer and the communication clock signal,
a destination synchronizer configured to output the enable signal in synchronization with the system clock signal, and a second data holding unit configured to acquire and hold the data signal held in the first data holding unit in response to the enable signal output from the destination synchronizer, and the system clock signal.

2. The asynchronous data holding circuit of claim 1, wherein the destination synchronizer comprises:
   a first D flip flop in which the enable signal output from the source synchronizer is input to a data terminal and the system clock signal is input to a clock terminal, and
   a second D flip flop in which an output terminal of the first D flip flop is connected to a data terminal, the system clock signal is input to a clock terminal, and the enable signal, which is synchronized with the system clock signal, is output from an output terminal.

3. The asynchronous data holding circuit of claim 1, wherein the source synchronizer comprises:
   a third D flip flop in which the enable signal is input to a data terminal and a set terminal, and the communication clock signal is input to a clock terminal, and
   a fourth D flip flop in which a data terminal is connected to the output terminal of the third D flip flop, the communication clock signal is input to a clock terminal, and the enable signal which is synchronized with the communication clock signal is output from an output terminal.

4. The asynchronous data holding circuit of claim 1 wherein the first data holding unit and the second data holding unit are configured to hold data signals of a plurality of bits.

5. An asynchronous data holding circuit comprising:
   a source synchronizer configured to receive an enable signal, which is synchronized with a system clock signal, in response to one of a rising edge and a falling edge of the enable signal, to acquire the other one of the rising edge and the falling edge of the enable signal in synchronization with a communication clock signal, and to output the received enable signal in synchronization with the communication clock signal,
   a first data holding unit configured to acquire and hold the received data signal, in response to the enable signal output from the source synchronizer and the communication clock signal,
   a delay unit configured to output the enable signal synchronized with a system clock signal with delay for a predetermined number of clocks of the system clock signal, and
   a second data holding unit configured to acquire and hold the data signal held in the first data holding unit in response to the enable signal output from the delay unit, and the system clock signal.

6. The asynchronous data holding circuit of claim 5, wherein the delay unit is formed by connecting a plurality of D flip flops corresponding to the predetermined number of clocks.

7. The asynchronous data holding circuit of claim 5 wherein the source synchronizer comprises:
   a third D flip flop in which the enable signal is input to a data terminal and a set terminal, and the communication clock signal is input to a clock terminal, and
   a fourth D flip flop in which a data terminal is connected to the output terminal of the third D flip flop, the communication clock signal is input to a clock terminal, and the enable signal which is synchronized with the communication clock signal is output from an output terminal.

8. The asynchronous data holding circuit of claim 5 wherein the first data holding unit and the second data holding unit are configured to hold data signals of a plurality of bits.

* * * * *